United States Patent [19]

Matovich

[11] Patent Number: 4,822,410

[45] Date of Patent: Apr. 18, 1989

[54] RECLAMATION OF METALS BY FLASH DIRECT REDUCTION

[75] Inventor: Edwin Matovich, Dana Point, Calif.

[73] Assignee: MKR, Inc., Costa Mesa, Calif.

[21] Appl. No.: 167,326

[22] Filed: Mar. 14, 1988

[51] Int. Cl.$^4$ .............................................. B22F 9/20
[52] U.S. Cl. ............................... 75/0.5 B; 75/0.5 BA; 75/0.5 BB; 75/10.13
[58] Field of Search ........................ 75/72, 0.5 B, 10.6, 75/10.61, 0.5 BA, 0.5 BB, 10.13

[56] References Cited

U.S. PATENT DOCUMENTS

| | | | |
|---|---|---|---|
| 2,261,196 | 11/1941 | Wellman et al. | 75/0.5 B |
| 2,978,315 | 4/1961 | Schenck et al. | 75/0.5 B |
| 2,990,267 | 6/1961 | Grebe et al. | 75/0.5 B |
| 4,569,691 | 2/1986 | Fichte et al. | 75/10.6 |

Primary Examiner—Melvyn J. Andrews

[57] ABSTRACT

A high-temperature chemical reaction process is performed in which a finely-divided volatile carbonaceous reductant is intimately mixed with finely-divided transition metal compounds and introduced, in entrained flow, into a strong radiative environment, inducing preferential heating of the solids and causing gasification of the volatile carbonaceous reductant principally to carbon monoxide gas and hydrogen gas. The gases in turn reduce the metal compounds to their parent metals. Nonvolatile metals in the form of small solid spheres are readily separated from their physical mixtures with spherical inorganic slags, making the process useful for the reclamation of metals from spent catalysts and low-grade ores. Because of the heterogeneous temperature distribution in the stream, reduced volatile metals are readily distilled out of nonvolatile melts, and condense in the cooler gas component of the stream as fine powders which are easily separated from the larger nonvolatile metal and slag fractions. This property of the process is particularly useful in the reclamation of metals from electric arc furnace dust.

14 Claims, No Drawings

RECLAMATION OF METALS BY FLASH DIRECT REDUCTION

The present invention relates to the direct reduction of transition metals of their parent metals by intimately mixing the finely-divided compounds with a volatile reductant of low density such as sawdust or wood flour and subjecting the mixture in intense thermal radiation. Upon exposure of the intense thermal radiation, the sawdust rapidly gasifies to high local concentrations of carbon monoxide and hydrogen. The transition metal compounds also upon exposure to the intense thermal radiation, are rapidly heated to their melting points, and quantitative direct reduction to their parent metals occurs by action of the high local concentrations of carbon monoxide and hydrogen. Dispersal of the product gases carbon dioxide and water occurs at a sufficiently high rate to minimize back reactions immediately following the reduction step.

To maximize exposure of the reductant-transition metal intimate mixture to the intense thermal radiation and mixture is preferably dispersed and entrained into a dilute stream of gases to achieve the highest practical surface area. Entrainment is greatly facilitated by use of a low-density fibrous reductant such as sawdust or RDF (refuse-derived fuel, consisting chiefly of paper), where the high-density metal compounds adhere to the reductant, minimizing bulk density and maximizing aerodynamic drag. Correspondingly exposure is maximized if the stream is irradiated from all angles, for example in a tube or chamber whose walls are heated to a temperature sufficiently high that radiative heat transfer dominates over convective or conductive heat transfer. With a proper choice of particle size and reactor temperature, the reduction may be performed in a very short time. Thus the best reactions are achieved with a dilute entrained stream of finely-divided materials having a short residence time in a radiant chamber, leading to a configuration whereby continuous in-stream direct reduction of finely-divided metal compounds is achieved, a major improvement over batch or semi-batch smelting or direct reduction processes in which finely-divided materials must of necessity be agglomerated or briquetted specifically to avoid gas entrainment of the fines and as a consequence require very long residence times for complete reactions. By being able to operate directly on fines, the process may economically use as feed materials many marginal or intermediate streams which would not ordinarily be considered as useful starting materials for conventional metal recovery technologies. Examples of such feed materials are taconite fines, flotation fines for copper, zinc, tin, or lead, electric arc furnace dust, and spent catalysts.

BACKGROUND OF THE INVENTION

Smelting of metallic ores has historically been carried out in blast furnaces for so long a period of time (the first recorded use of a blast furnace to produce molten pig iron is in the 14th century A.D.) that both the furnace designs and the basic processes for the making of pig iron are considered to be in the public domain, and recent inventive activity has concentrated more on methods of improved control and optimization to achieve higher yields, higher efficiencies, or better overall furnace economics (for example U.S. Pat. No. 4,273,577 described a control method to optimize product of iron in a given furnace, while U.S. Pat. No. 4,432,790 describes a furnace construction design which minimizes the consumption of coke. U.S. Pat. No. 1,984,793 describes the simultaneous production of Portland cement and pig iron to improve the value of the blast furnace product, while U.S. Pat. Nos. 1,941,793 and 1,964,402 describe methods of reduction of iron ore in blast furnaces which improve the production rates of the furnace). In all of these processes steps are taken to minimize the introduction of fines, since they are generally entrained and lost from the system. In U.S. Pat. No. 4,436,552, methods are discussed of removing the fines from the iron ore charge prior to its being introduced into a blast furnace.

Direct-reduction processes by which the metallic ore is reduced below its melting point, or in some cases reduced above its melting point with a gas rather than with coke or other solid reductant also seek generally to eliminate or minimize the introduction of fines into the reducing apparatus to preserve as high a process efficiency as possible. For example, U.S. Pat. No. 4,238,225 discuses the sintering of iron ore to produce briquets prior to a direct reduction with radio frequency processing, and U.S. Pat. No. 1,849,561 describes the requirement for lump ore for an efficient shaft-furnace process.

U.S. Pat. No. 2,797,989 also describes a process for the production of sponge iron from lump iron ore.

While there are processes and apparati which are designed for the use of finely-divided materials (for example U.S. Pat. No. 2,780,537 describes a method of reducing pulverized iron oxides in a fluidized-bed furnace and U.S. Pat. No. 4,238,226 describes a method of direct reduction of blowing iron oxide powder and pulverized coal into a molten iron bath), none seem to have addressed the problem of exclusively treating the very fine powders which are captured as a result of environmental control. U.S. Pat. No. 4,056,602 discusses the hydrogen reduction of entrained iron oxide in a high-temperature furnace, but does not address the generation of reducing gas nor the separation of complex ores as an integral part of the process.

Environmental control has been responsible for the elimination of much of the visual pollution associated with established industries.

In fact, many of the pejorative descriptions of "smokestack industries" derived from observations of uncontrolled emissions of gas-entrained fines from smelters and kilns, and considerable effort has been spent to keep these emissions to a minimum, thus abating visible atmospheric pollution.

The minimizing of fines emissions in smelting and other processes has produced a number of potential by-product feed materials, both for preparation operations and from capture of the stack fines: for example finely-divided crude iron oxides from taconite beneficiation; "red mud" iron oxide fines from bauxite purification; "breeze" from coal and coke washing and de-dusting, and baghouse dust from electric arc furnace operations. These materials are currently disposed or in simple fashion in ponds or landfills, generally because of the expense required to put them into a form useful for existing technology. The present invention allows the use of these finely-divided materials directly, thus enhancing their economic value and encouraging their recovery rather than environmentally unacceptable disposal.

For the examples of electric arc furnace dust, the dust contains in addition to iron oxides a high concentration of groundwater-leachable zinc and lead oxides which has rendered it no longer disposable in landfill, according to U.S. environmental legislation. Therefore a practical methods to recover the iron, lead, and zinc would eliminate the disposal problem for any slag residue, and would pay for the process through sale of the recovered metals. One method of processing the dust is to agglomerate it with coke into "greenballs" and fire the "greenballs" in a flame-fired rotary kiln (for example, U.S. Pat. No. 2,062,869). This kiln process produces fumes of lead and zinc oxides which are collected in bag filters and then subsequently reduced to the respective metals in a separate reduction step, such as are described in U.S. Pat. Nos. 3,984,235 and 4,017,308. In conventional zinc and lead smelting, the iron and slag from the primary smelting generally are both discarded.

The present invention represents significant improvements over prior art in that no pre-preparation of feed is necessary other than blending of the reductant with the electric arc furnace dust, and all transition metal compounds are beneficially recovered as metals, requiring no further processing steps.

SUMMARY OF THE INVENTION

Basic Chemistry and Physics

Mill-run pine sawdust at 15% moisture (ignoring ash and minor constituents) has a composition

| Carbon: | 56.76 weight percent |
| Hydrogen: | 5.20 weight percent |
| Oxygen: | 22.71 weight percent |
| Water: | 15.00 weight percent | with an equivalent formula $$C H_{1.1} O_{3.3}(H_2O)_{0.18}$$

and a formula weight of 21.14 grams. Under intense irradiation conditions, for example at a thermal radiative flux of 200 watts per square centimeter, corresponding to a heater surface temperature of 4000 degrees F. (2204 degrees C.), the sawdust will undergo the overall following rapid flash gasification reaction:

$$C H_{1.1} O_{0.3}(H_2O)_{0.18} \rightarrow 0.48\ CO + 0.78\ H_2 + 0.52\ C.$$

The gasification of the sawdust upon exposure to the intense radiation proceeds in two steps, 1. The exothermic conversion of chemically-bound oxygen to carbon monoxide $$C H_{1.1} O_{0.3}(H_2O)_{0.18} \rightarrow 0.3\ CO + 0.55\ H_2 + 0.7\ C + 0.18\ H_2O + 8.04\ Kcal$$

and

2. The endothermic water-gas reaction of the contained water with residual carbon $$0.7\ C + 0.18\ H_2O + 5.58\ Kcal \rightarrow 0.18\ CO + 0.18\ H_2 + 0.52\ C$$

3. For an overall reaction $$C H_{1.1} O_{0.3}(H_2O)_{0.18} + 0.48\ CO + 0.73\ H_2 + 0.52\ C + 2.46\ Kcal.$$

If the sawdust has been previously mixed with a metal oxide such as hematite, $Fe_2O_3$, then subsequent rapid reactions would also occur:

$$0.48\ CO + 0.32\ Fe + 0.48\ CO_2$$

$$0.48\ CO_2 + 0.52\ C \rightarrow 0.96\ CO + 0.04\ C$$

$$0.96\ CO + 0.32\ Fe_2O_3 \rightarrow 0.64\ Fe + 0.96\ CO_2$$

$$0.96\ CO_2 + 0.44\ C \rightarrow 0.88\ CO + 0.92\ CO_2$$

$$0.08\ C + 0.027\ Fe_2O_3 \rightarrow 0.054\ Fe + 0.08\ CO_2$$

$$0.73\ H_2 + 0.24\ Fe_2O_3 \rightarrow 0.48\ Fe + 0.73\ H_2O$$

for an overall reaction $$C H_{1.1} O_{0.3}(H_2O)_{0.18} 0.747\ Fe_2O_3 \rightarrow 1.49\ Fe + CO_2 + 0.73\ H_2O, \text{ or}$$

$$0.18\ \text{lb Sawdust} + 1.0\ \text{lb Hematite} \rightarrow 0.70\ \text{lb Iron} + 3.0\ \text{SCF } CO_2 + 2.2\ \text{SCF } H_2O.$$

Thus the sawdust reductant can be completely utilized in the reduction of the metal oxide. Also, the reactions are predominantly "local" in that they occur in the immediate vicinity of the sawdust particle. For the example given above with sawdust specific gravity=0.8 (grams per cubic centimeter) and hematite specific gravity=5.24 (grams per cubic centimeter) the volume of the components are roughly equal and indeed for a case of $Fe_2O_3$ particle diameter<1 micron (0.0001 centimeter), and sawdust sieve range −20 mesh (see "Experimental Example"), the "ensemble" has the visual appearance under a low-power microscope of red-dusted wood chips. With this physical arrangement the hematite will in all probability be heated to its melting point (1565 degrees C., or 2849 degrees F.) about the same time that the sawdust is terminally gasified. Thus the chemical reactions will most likely occur with them metal oxide in its molten state, producing a liquid metal droplet which will then quench to a sphere upon being removed from the radiation source.

Agglomeration or coalescence of adjacent droplets at the same particle "ensemble" site may occur; however, with entrained flow under laminar or very mildly turbulent conditions, the probability of separate "ensembles" colliding to produce large agglomerates is very small, thus the final spherical product size will be determined by the total amount of metal oxide originally adhered to a single particle of the sawdust "substrate."

The energy required for the overall reaction is the sum of the energies needed for the several reaction steps which are apparent from experimental observations, but which require as a first approximation the reaction energy for the overall reaction and the sensible heats of the products at the exit temperature of the radiant chamber. With the exothermic heat of reaction of 1 formula weight of sawdust at +2.46 Kcal and the heats of formation for $Fe_2O_3$, $CO_2$, and $H_{at}$ 196.7, 95.0, and 57.8 Kcal, respectively, then the energy required for complete reaction of one formula weight of sawdust and 0.747 moles of $Fe_2O_3$ will be actually exothermic at approximately +8.33 Kcal/formula weight sawdust (+11.15 Kcal/mole $Fe_2O_3$). In an entrained flow-radiant reactor configuration the output temperature for the stream was observed to be 1650 degrees F. (899 degrees C.) and so the net sensible heat for the solid Fe/$CO_2$/-

$H_2O$ product will be on the order of 26.4 Kcal, and the overall process will be endothermic at 18.1 Kcal per formula weight of sawdust (160 KWH of electrical energy to provide radiant energy for 1 ton of hematite, or 229 KWH per ton of produced iron).

In actual engineering practice, there are additional inert components (as with entrainment gases and slag), and the overall process draws yet more radiant energy. If the iron product is taken out above its melting temperature, then additional sensible heat to 1565 degrees C. and the heat of fusion of the iron must be taken into account. In this case the overall sensible heat load will be 51.28 Kcal, requiring a net radiant energy input of 421.95 Kcal per formula weight of sawdust (543 KWH per ton of molten iron produced).

Similarly, if oxides of volatile metals (zinc and lead, for example) are flash reduced under the same conditions of high radiative flux and high terminal temperatures the parent metal will be produced but since the reaction is occurring at temperatures above their boiling points (907 degrees C. and 1744 degrees C., respectively for the zinc and the lead metals) their final collected form will not be the larger spherical form of coalesced liquids but rather will be in the "smoke" form of condensed vapors. These condensed metal vapors are readily collected at low temperatures with conventional bag filters, or at higher temperatures by passing them through baths of the parent molten metal.

This evaporation of the volatile metals provides a ready means of separating high concentrations of (e.g.) zinc and lead as metals from ores and concentrates, or from mixtures of slag and nonvolatile metals. Conversely, the reduction and evaporation features of the present invention provides a ready means by which volatile toxic metals such as lead or cadmium (boiling point 765 degrees C.) may readily be removed from slags and dusts, rendering the residue safe for landfill disposal.

Such a mixture is exemplified by electric arc furnace dust, a waste material created by the volatilization and oxidation of zinc, lead, cadmium, iron, manganese, copper, and chromium, and by volatilization of refractory materials silica ($SiO_2$), calcia (CaO), alumina ($Al_2O_3$), magnesia (MgO), and alkaline oxides $Na_2O$ and $K_2$).

Composition of a typical electric arc furnace (EAF) dust is as follows:

| | |
|---|---|
| Zinc oxide, ZnO: | 20.31 weight percent |
| Lead oxide, PbO: | 2.53 weight percent |
| Cadmium oxide, CdO: | 0.08 weight percent |
| Copper oxide, CuO: | 0.27 weight percent |
| Iron oxide, $Fe_2O_3$: | 40.64 weight percent |
| Manganese oxide, MnO: | 3.77 weight percent |
| Chromium oxide, $Cr_2O_3$: | 0.16 weight percent |
| Silica, $SiO_2$: | 4.96 weight percent |
| Alumina, $Al_2O_3$: | 0.72 weight percent |
| Calcia, CaO: | 19.82 weight percent |
| Magnesia, MgO: | 2.39 weight percent |
| Sodium oxide, $Na_2O$: | 1.04 weight percent |
| Potassium oxide, $K_2O$: | 0.79 weight percent |
| Carbon, C: | 1.97 weight percent |
| Sulfur, S: | 0.55 weight percent |
| Total: | 100.00 weight percent |

Many of the components listed are of sub-micron size. The cadmium and lead oxides are water soluble and as a consequence render the material unfit for landfill disposal.

If the EAF dust is processed by the method of the present invention, then there exists the possibility of economic recovery of all the metals: each tone of EAF dust will produce approximately 223 lb of zinc, 47 lb of lead, and 1.4 lb of cadmium, all as dust; 633 lb of ferrous alloy of approximate composition Fe 88.7%, Mn 9.2%, Cu 0.7%, and Cr 0.5%; and 605 lb of slag. Even with crude metal prices the value of the recovered metals have the potential of more than offsetting the complete cost of processing, thus encouraging reclamation of the material and discouraging simple disposal with its adverse environmental consequences.

Many other examples of metal reductions and separations are possible utilizing the present invention:

One particular other application of the invention is the recovery of metals from spent catalysts, particularly those in which transition metals or transition metal compounds are admixed or plated onto ceramic substrates. These spent catalysts may be treated by way of the present invention to produce nonvolatile spherical products consisting of mixtures of fused metallic alloys and fused ceramics, such mixtures being readily separated by physical means such as magnetic or gravity separation. Depending on the composition of the ceramic substrate, fluxing agents as are well known in the art may be added to improve fluidity and hence separability of the physical mixture of the metals and slags.

Examples of such nonvolatile metals which are recoverable from spent catalyst by way of the present invention are: Vanadium (V), Chromium (Cr), Manganese (Mn), Iron (Fe), Cobalt (Co), Nickel (Ni), Copper (Cu), Molybdenum (Mo), Silver (Ag), Tin (Sn), Tantalum (Ta), Tungsten (W), or Bismuth (Bi).

Moreover, three of the above metals, Vanadium (V), Tungsten (W), and Molybdenum (Mo), may be separated from other metals and slags by the simple addition of an oxidant to the spent catalyst. Thus, by adding (e.g.) sodium nitrate, sodium carbonate, or sodium perchlorate to the spent catalyst will convert these three metals to their respective volatile oxides before reduction takes place. Thus, the metals are formed by gas-phase reduction of the oxide vapor by carbon monoxide and hydrogen to produce a very finely-divided metallic powder. The powder forms of Vanadium, Tungsten, and Molybdenum are extremely pyrophoric, and care must be taken in their handling. Alternatively to the recovery of these three metals by way of the invention, the present invention also provides a convenient method whereby their finely-divided powders may be prepared.

The above examples are not meant to be limiting in scope as to applicability. Other reductants such as peat, brown coal, lignite, municipal solid waste, scrap paper, or bituminous coal may be used. Similarly metallic compounds other than oxides may be successfully reduced by means of the present invention. Thus sulfides, sulfates, halides, nitrates, or phosphates of the parent metals may be converted to the parent metal by flash direct reduction with a volatile reductant. The extension of the invention to other examples or combinations of metal compounds, slags, and reductants should be obvious to one familiar with pyrometallurgical processes.

Invention Summary

1. In the present high temperature chemical reaction process, a finely-divided metallic compound is intimately mixed with a finely-divided volatile reductant, and the mixture dispersed and entrained in a gas stream, and then exposed to a high level of thermal radiation to cause rapid gasification of the reductant and flash reduction of the metal compound to its parent metal.

2. If the metal is nonvolatile, the product is in the form of metallic beads. An example is the flash direct reduction of iron oxide to produce iron metal.

3. If the finely-divided original nonvolatile metal compound is admixed with a finely-divided fusible refractory material, such as the gangue of an ore, then the product is in the form of a physical mixture of discrete metallic beads and discrete refractory beads. The mixture may be separated by physical means owing to the different specific gravities of the metallic beads and the refractory beads, or may be separated by magnetic means owing to the different magnetic susceptibilities of the metallic beads and the refractory beads.

Examples are the flash direct reduction of gruenerite, $FeSiO_3$, to iron metal and silica, $SiO_2$, and the flash direct reduction of ilmenite, $FeTiO_3$, to iron metal and rutile, $TiO_2$. The latter example may also serve as a convenient means to separate the rutile from the ilmenite as the two fractions may conveniently be separated magnetically.

4. If the original nonvolatile metal compound and its original admixture with the fusible refractory material are not finely divided, then steps should be taken to reduce their physical size to conform to 100%-100 mesh before they are intimately mixed with the finely-divided volatile reductant.

5. If the original nonvolatile metal compound is admixed with infusible or difficultly fusible refractory material such as alumina, calcia, or magnesia, then fluxing agents such as borax, sodium carbonate, or high-alkali clays may be added to and intimately blended with the reductant-volatile metal compound to cause the refractory material to have both a lower melting temperature and a much lower viscosity, aiding in the separate formation of the refractory beads and the nonvolatile metal beads, and facilitating the separation of the final physical mixture. In this case as with the others cited, the individual particles of the metal compound, the refractory, and the fluxing agent(s) all should be finely divided to correspond to 100%-100 mesh, and the high-volatile reductant should be finely divided to 100%-20 mesh.

6. If the original finely-divided metallic compound is a compound of a volatile metal, and is intimately mixed with a finely-divided volatile reductant, and the mixture dispersed and entrained in a gas stream, and then exposed to a high level of thermal radiation to cause rapid gasification of the reductant and flash direct reduction of the volatile metal compound to its parent volatile metal, then the solid product is in the form of a condensed metal fume, or finely-divided metal powder, typically on the order of 15 microns (0.0015 cm) particle diameter. Examples are the direct flash reduction of zinc oxide (to zinc metal and $CO_2+H_2O$), lead oxide (to lead metal and $CO_2+H_2O$), and zinc sulfide (to zinc metals and $H_2S+COS$).

7. If the original finely-divided metal compound is admixed with a finely-divided nonvolatile metal compound, then the solid products stream will consist of nonvolatile metal spherical beads typically with diameters 100-200 microns (0.01-0.02 cm) and condensed fume volatile metals with particle diameters on the order of 15-40 microns (0.0015-0.0040 cm). The two products may be separated by elutriation owing to their different settling rates in a gas stream, or may be separated magnetically owing to their different magnetic susceptibilities. In any case, separation of the powders from the beads is readily performed by a number of technologies known to those familiar with classifying methods, and the present invention affords a convenient method for putting the volatile metals and nonvolatile metals into separable forms.

8. If the admixture of the original finely-divided volatile metal compounds and finely-divided nonvolatile compounds are further admixed with a finely-divided fusible refractory material, then the solid product mix after the flash direct reduction reaction is made up of spherical nonvolatile metal beads typically with diameters 100-200 microns, spherical refractory beads also typically with particle diameters 100-200 microns, and condensed fume volatile metals with particle diameters on the order of 15-40 microns. The condensed volatile metal fumes may be separated from the spherical nonvolatile metal and fused refractory product by elutriation, and the larger spheres separated from each other by gravity or magnetic separation as described earlier. An example of 8 is the flash direct reduction of electric arc furnace dust from the steelmaking industry to zinc and lead metal powders, ferrous alloy beads, and slag beads, and $CO_2$ and $H_2O$.

9. Fluxing agents may be added to the admixture of 8 in the case that the refractory material is infusible or fusible with difficulty. The solid product mix will be the same as 8, with the same consideration for separation.

10. If the original admixture of volatile metal compounds contains metal compounds which are themselves volatile or which may readily be converted to volatile compounds even though the parent metal is nonvolatile, along with nonvolatile metal nonvolatile compounds, then the solid product will be a mixture of spherical nonvolatile metal beads typically with diameters 100-200 microns, and other nonvolatile metal powders with particle sizes 15-40 microns. The smaller particles may readily be separated by elutriation. An example is the separation of vanadium, molybdenum, and cobalt from spent hydrodesulfurizing catalyst on a kieselguhr base by mixing sodium nitrate with the pulverized catalyst, intimately mixing the resultant mix with wood flour, and exposing the total to high radiative flux to (1) convert the vanadium to $V_2O_5$ and the molybdenum to $MoO_3$ and evaporating them; (2) gasifying the wood flour to CO, hydrogen, and carbon; (3) reducing the vapors of $V_2O_5$ and $MoO_3$ to V metal and Mo metal, respectively, as fumes; (4) reducing the cobalt compound to Co metal and melting it to spherical droplets; and (5) melting the kieselguhr to spherical droplets. Upon being removed from the high radiative flux, the solid product mix will be as described above.

EXPERIMENTAL EXAMPLE

Two hundred forty pounds (240 lb) of electric arc furnace dust of composition

| | |
|---|---|
| ZnO: | 20.31 weight percent |
| PbO: | 2.53 weight percent |
| CdO: | 0.08 weight percent |
| CuO: | 0.27 weight percent |
| $Fe_2O_3$: | 40.64 weight percent |
| MnO: | 3.77 weight percent |
| $Cr_2O_3$: | 0.16 weight percent |
| $SiO_2$: | 4.96 weight percent |
| $Al_2O_3$: | 0.72 weight percent |
| CaO: | 19.82 weight percent |
| MgO: | 2.39 weight percent |
| $Na_2O$: | 1.04 weight percent |

| | |
|---|---|
| $K_2O$: | 0.79 weight percent |
| C: | 1.97 weight percent |
| S: | 0.55 weight percent |
| Total: | 100.00 weight percent | was intimately mixed with forty compounds (40 lb) of −20 mesh sawdust of composition

| | |
|---|---|
| C: | 56.02 weight percent |
| H: | 5.13 weight percent |
| O: | 22.42 weight percent |
| $H_2O$: | 14.81 weight percent |
| Ash: | 1.62 weight percent |
| Total: | 100.00 weight percent | in a vee-blender to produce 280 lb (two hundred eighty pounds) of feed material.

The feed material was introduced at a rate of 4.25 pounds per minute into a 12" inside diameter by 72" long vertical downdraft tubular electrical radiant furnace controlled at 4000 degrees F. (2204 degrees C.), along with 15 standard cubic feet per minute of nitrogen as a dispersion and entrainment gas, for a duration of 60 minutes, a total of 225 lb (two hundred fifty-five pounds) of feed material introduced.

The output stream from the radiant furnace was cooled by passing it through a vertical radiant cooling tube of dimensions 36" inside diameter by 96" long, then passed through a settling chamber (counterflow vertical stream velocity approximately 0.5 feet per second) to drop the solids, and finally was passed through a fabric filter to remove quantitatively the remaining solids from the gas stream. The gases were vented to atmosphere downstream of the fabric filter.

One hundred fifteen pounds (115 lb) was collected from the settling chamber and 19.2 lb of material was collected from the fabric filter. The filtered material was a metallic gray color, and burned readily with a blue-green flame to leave a white residue, indicating a high concentration of zinc metal. Chemical and physical analyses of the fabric filter material yielded the following composition:

| | |
|---|---|
| Zn metal: | 57.02 weight percent |
| Pb metal: | 9.91 weight percent |
| Cd metal: | 0.24 weight percent |
| Fe metal: | 8.46 weight percent |
| Cr metal: | 0.04 weight percent |
| Cu metal: | 0.37 weight percent |
| Mn metal: | 1.21 weight percent |
| S: | 0.41 weight percent |
| $Na_2O$: | 3.40 weight percent |
| $K_2O$: | 1.84 weight percent |
| MgO: | 1.14 weight percent |
| CaO: | 8.34 weight percent |
| $Al_2O_3$: | 0.53 weight percent |
| $SiO_2$: | 7.09 weight percent |
| Total: | 100.00 weight percent |

The settling chamber material had much the same appearance as the filter material, but coarser. Microscopic examination of the settling chamber material revealed it to be a mass of small spheres, dusted with the metallic powder observed in the filter. Chemical and physical analyses of the settling chamber material yielded the following composition:

| | |
|---|---|
| Zn metal: | 11.51 weight percent |
| Pb Metal: | 1.15 weight percent |
| Cd metal: | 0.02 weight percent |
| Fe metal: | 30.31 weight percent |
| Cr metal: | 0.15 weight percent |
| Cu metal: | 0.15 weight percent |
| Mn metal: | 2.93 weight percent |
| S: | 0.21 weight percent |
| $Na_2O$: | 0.96 weight percent |
| $K_2O$: | 0.32 weight percent |
| MgO: | 3.17 weight percent |
| CaO: | 23.40 weight percent |
| $Al_2O_3$: | 0.53 weight percent |
| $SiO_2$: | 24.71 weight percent |
| Total: | 100.00 weight percent |

A simple magnetic separation of the settling chamber material (passing a bar magnet over the sample and tapping loose material free from the magnetically-attached material) produced what appeared to be predominantly iron beads. Chemical and physical analyses of the magnetically-separated beads gave the following composition:

| | |
|---|---|
| Zn metal: | 2.28 weight percent |
| Pb metal: | 0.03 weight percent |
| Cd metal: | ND |
| Fe metal: | 76.39 weight percent |
| Cr metal: | 0.07 weight percent |
| Cu metal: | 0.16 weight percent |
| Mn metal: | 3.62 weight percent |
| S: | ND |
| $Na_2O$: | ND |
| $K_2O$: | ND |
| MgO: | 3.55 weight percent |
| CaO: | 4.69 weight percent |
| $Al_2O_3$: | 0.32 weight percent |
| $SiO_2$: | 8.89 weight percent |
| Total: | 100.00 weight percent |

Thus it appeared that the reduction of all metallic compounds was complete, and that an almost complete separation of volatile metals from nonvolatile metals could be accomplished by simple physical means. Carryover of (apparently) fumes of $SiO_2$ and CaO, and the alkaline oxides $Na_2O$ and $K_2O$ with the volatile metals will require some further separation steps to produce the pure metals. It is quite possible that fluxing to produce a more fluid refractory melt would minimize fuming or carryover of the refractory materials into the volatile metal stream, leaving them behind instead as fused refractory beads.

I claim:

1. A high-temperature chemical reaction process for the reclamation of metals which comprises: intimately mixing finely-divided solid metal compounds with a finely-divided solid oxygenated carbonaceous reductant, placing said mixture into gaseous entrained flow, and subjecting said gas-entrained mixture to electromagnetic radiation of sufficiently high intensity and for a sufficient exposure time to raise the temperature of said solid oxygenated carbonaceous reductant sufficiently high to decompose said solid oxygenated carbonaceous reductant into reducing gases and at the same time to raise the temperature of the solid metal compounds sufficiently high to cause them to react with said reducing gases, producing the parent metals.

2. A high-temperature chemical reaction process according to claim 1 in which the metal compound is derived from the group V, Cr, Mn, Fe, Co, Ni, Cu, Zn, Nb, Mo, Ag, Cd, In, Sn, Sb, Ta, W, Pb, and Bi.

3. A high-temperature chemical reaction process according to claim 1 in which the reductant is derived from the group biomass, sawdust, wood flour, paper, waste paper, refuse-derived fuel, peat, peat moss, brown coal, lignite, sub-bituminous coal, and bituminous coal.

4. A high-temperature chemical reaction process according to claim 2 in which the reductant is derived from the group biomass, sawdust, wood flour, paper, waste paper, refuse-derived fuel, peat, peat moss, brown coal, lignite, sub-bituminous coal, and bituminous coal.

5. A high-temperature chemical reaction process according to claim 1 in which the metal compounds are compounds of nonvolatile metals.

6. A high-temperature chemical reaction process according to claim 5 in which the metal compounds are compounds of V, Cr, Mn, Fe, Co, Ni, Cu, Sn, and Ta.

7. A high-temperature chemical reaction process according to claim 1 in which the metal compounds are compounds of volatile metals.

8. A high-temperature chemical reaction process according to claim 7 in which the metal compounds are compounds of Zn, Pb, Cd, Bi, and Sb.

9. A high-temperature chemical reaction process according to claim 4 in which the metal compounds are mixed compounds of volatile and nonvolatile metals.

10. A high-temperature chemical reaction process for the reclamation of metals which comprises: intimately blending mixtures of, or compounds of, finely-divided metal compounds and nonreducible refractory materials with a finely-divided solid oxygenated carbonaceous reductant, placing said blended mixture into gaseous entrained flow, and subjecting said gas-entrained mixture to electromagnetic radiation of sufficiently high intensity for a sufficient exposure time to raise the temperature of the solid oxygenated carbonaceous reductant sufficiently high to decompose said solid oxygenated carbonaceous reductant into reducing gases and at the same time to raise the temperature of said mixtures of, or compounds of, finely-divided metal compounds and nonreducible refractory materials sufficiently high to cause said mixtures of compounds to react with said reducing gases, producing a separable mixture of individual particles of parent metals and individual particles of fused nonreducible refractory materials.

11. A high-temperature chemical reaction process according to claim 10 in which the metal compound is a mixture of compounds of volatile and nonvolatile metals and the non-reducible refractory material is derived from the group MgO, $Al_2O_3$, $SiO_2$, CaO, and $TiO_2$.

12. A high-temperature chemical reaction process according to claim 11 in which the mixture of metal compounds and refractory material is derived from electric arc furnace dust.

13. A high-temperature chemical reaction process according to claim 12 in which the mixture of metal compounds and refractory material is derived from spent catalysts.

14. A chemical process according to claim 12 in which the volatile metals are distilled out of the parent metal particles and are collected as condensed fumes.

* * * * *